(12) United States Patent
Kato

(10) Patent No.: US 9,111,567 B1
(45) Date of Patent: Aug. 18, 2015

(54) DISK DRIVE

(71) Applicant: ALPINE ELECTRONICS, INC., Shinagawa-ku, Tokyo (JP)

(72) Inventor: Ichiro Kato, Iwaki (JP)

(73) Assignee: ALPINE ELECTRONICS, INC., Tokyo (JP)

(*) Notice: Subject to any disclaimer, the term of this patent is extended or adjusted under 35 U.S.C. 154(b) by 0 days.

(21) Appl. No.: 14/596,437

(22) Filed: Jan. 14, 2015

(30) Foreign Application Priority Data

Mar. 3, 2014 (JP) ................................. 2014-040348

(51) Int. Cl.
*G11B 17/04* (2006.01)
*G11B 17/051* (2006.01)

(52) U.S. Cl.
CPC .............. *G11B 17/051* (2013.01); *G11B 17/04* (2013.01)

(58) Field of Classification Search
CPC .............................. G11B 17/051; G11B 17/04
USPC ........................................................ 720/624
See application file for complete search history.

(56) References Cited

U.S. PATENT DOCUMENTS

| | | | |
|---|---|---|---|
| 2003/0112716 A1* | 6/2003 | Otsuki et al. ............... | 369/30.36 |
| 2003/0210618 A1* | 11/2003 | Kimikawa et al. ......... | 369/30.36 |
| 2005/0195700 A1* | 9/2005 | Iwatani et al. ............. | 369/30.27 |
| 2007/0081270 A1* | 4/2007 | Abe et al. ................... | 360/98.05 |
| 2007/0258347 A1* | 11/2007 | Aoki et al. ................. | 369/258.1 |
| 2009/0055848 A1* | 2/2009 | Urushihara et al. ........ | 720/620 |
| 2012/0124600 A1* | 5/2012 | Okuyama et al. .......... | 720/620 |

FOREIGN PATENT DOCUMENTS

JP 2008-135106 6/2008

* cited by examiner

*Primary Examiner* — Angel Castro
(74) *Attorney, Agent, or Firm* — Brinks Gilson & Lione

(57) ABSTRACT

A disk drive includes an insertion detection unit disposed at a position deviating from a transport center line in a first direction, a transport roller, and an opposing member that holds a disk together with the transport roller. The opposing member has a second guiding recess located in a second direction relative to the transport center line. The recess of the opposing member and the transport roller define a space therebetween to receive the disk inserted from a position deviating from the transport center line in the second direction.

17 Claims, 7 Drawing Sheets

DISK DRIVE

RELATED APPLICATION

The present application claims priority to Japanese Patent Application Number 2014-040348, filed Mar. 3, 2014, the entirety of which is hereby incorporated by reference.

BACKGROUND

1. Field

The present invention relates to a disk drive including a disk insertion detection unit.

2. Description of the Related Art

Slot-loading disk drives are typically used in vehicles. Japanese Unexamined Patent Application Publication No. 2008-135106 discloses a disk drive including two rotary arms arranged inside an opening through which a disk is inserted. The two rotary arms rotate independently of each other. One of the two rotary arms causes switching of a switch SW1 and switching of a switch SW2, and the other one of the two rotary arms causes switching of a switch SW3.

When a disk is inserted through the opening, the rim of the disk presses the two rotary arms, thus rotating the rotary arms. When the two rotary arms rotate and at least one of the switches SW2 and SW3 is switched on, a motor drive mechanism is activated to rotate transport rollers in a loading direction, so that the disk sandwiched between the transport rollers and opposing members is loaded or transported into the disk drive with a force generated by rotation of the transport rollers.

To eject or unload the disk from the disk drive, the disk is sandwiched between the transport rollers and the opposing members and the transport rollers are driven to rotate in an unloading direction, so that the disk is unloaded or transported out of the disk drive through the opening. During the unloading, the two rotary arms are pressed and rotated by the rim of the disk. When the switch SW1 is switched off, the motor is stopped, thus stopping the rotation of the transport rollers. The unloaded disk is held in such a manner that the leading part of the disk projects from the disk drive through the opening, the trailing part of the disk remains in the disk drive, and the trailing part is sandwiched between the transport rollers and the opposing members.

In this type of disk drive, it is preferred that when a disk is inserted through the opening, the transport rollers should start to rotate in the loading direction before the disk comes into contact with the transport rollers. Consequently, the disk inserted while being held by a user's hand can be drawn into a gap between the transport rollers and the opposing members without hitting against the transport rollers. Thus, the disk can be smoothly transported into the disk drive.

A disk is not necessarily inserted into the opening from a position aligned with a central part of the opening along its width. In some cases, a disk may be inserted into the opening from a position deviating from the central part of the opening in a first direction along the width of the opening. The disk drive disclosed in Japanese Unexamined Patent Application Publication No. 2008-135106 is configured such that one of the two rotary arms causes switching of the switch SW2, the other one of the two rotary arms causes switching of the switch SW3, and the transport rollers are caused to start rotating when at least one of the switches SW2 and SW3 is switched on. If a disk is inserted from any position, the transport rollers can be caused to start rotating in the loading direction before the disk comes into contact with the transport rollers.

When a disk is unloaded, the transport rollers need to be stopped in a state where the trailing part of the disk located at an ejection position is sandwiched between the transport rollers and the opposing members. This prevents the disk from falling out of the disk drive before the disk is pulled out by a user's hand.

As described above, a position at which a disk actuates the switch for detecting insertion of the disk needs to differ from a position at which the disk actuates the switch for detecting ejection of the disk. The disk drive disclosed in Japanese Unexamined Patent Application Publication No. 2008-135106 accordingly includes the two switches SW2 and SW3 for detecting insertion and the single switch SW1 for detecting ejection. The three switches are arranged in order to detect insertion and ejection. This arrangement needs many parts and accordingly results in an increase in the number of steps of assembly adjustment, leading to an increase in assembly cost.

If a pair of rotary arms (a first rotary arm and a second rotary arm) rotating independently of each other are configured such that the first rotary arm causes switching of the switch SW2 for detecting insertion and the second rotary arm causes switching of the switch SW1 for detecting ejection, the number of switches can be reduced. In this case, if a disk is inserted from a position close to the second rotary arm, the disk will come into contact with the transport rollers but the first rotary arm will not be rotated sufficiently and accordingly will fail to switch on the switch SW2. Unfortunately, the transport rollers will not start to rotate.

In this case, if a coupling mechanism is disposed between the first and second rotary arms in order to achieve synchronous rotation of the rotary arms, the switch SW2 can be switched on in response to rotation of the first rotary arm or the second rotary arm, thus rotating the transport rollers in the loading direction. Disadvantageously, a coupling mechanism having a complicated structure is needed, thus allowing a disk drive to have a complicated configuration, which leads to an increase in manufacturing cost.

SUMMARY

Embodiments of the present invention are intended to overcome the above-described disadvantages in the related art. The present disclosure provides a disk drive including a single insertion detection member and being capable of achieving smooth loading of a disk by causing a transport roller to start rotating in a loading direction in response to insertion of the disk from any position into the disk drive.

The present disclosure provides a disk drive including a transport roller, a motor drive mechanism that drives and rotates the transport roller, an opposing member facing the transport roller, an insertion detection unit disposed at a position deviating in a first direction along an axis of the transport roller from a transport center line that passes through a central part of the transport roller along the axis of the transport roller so as to extend in both a loading direction in which a disk sandwiched between the transport roller and the opposing member is transported into the disk drive with a force generated by rotation of the transport roller and an unloading direction in which the disk sandwiched between the transport roller and the opposing member is transported out of the disk drive with a force generated by rotation of the transport roller, and a control unit that activates the motor drive mechanism to rotate the transport roller in the loading direction when the insertion detection unit is actuated by the disk. The transport roller and the opposing member define a space therebetween to receive the disk inserted from a position deviating from the transport center line in a second direction along the axis of the transport roller.

In this disk drive, when the space receives the disk inserted from the position deviating from the transport center line in the second direction, the insertion detection unit may detect the disk.

In the disk drive, the insertion detection unit is disposed at the position deviating from the transport center line in the first direction. If the disk is inserted from a position deviating from the transport center line in the second direction, the disk would tend to come into contact with the transport roller before the insertion detection unit detects the disk. The space which the disk is allowed to enter is however defined in the second direction between the transport roller and the opposing member. Consequently, if the disk is inserted from a position deviating from the transport center line in the second direction, the transport roller can be allowed to start rotating in the loading direction without causing a large resistance that interferes with insertion of the disk.

In the disk drive, the opposing member may have a recess in at least a portion in the second direction relative to the transport center line and the recess may face the transport roller with the space therebetween.

The space can be formed between the transport roller and the opposing member by reducing the diameter of the transport roller or partly removing the transport roller at a position deviating from the transport center line in the second direction.

The disk drive may further include an ejection detection unit that is actuated by the disk when the disk transported out of the disk drive by rotation of the transport roller in the unloading direction reaches a predetermined ejection position. When the ejection detection unit is actuated, the rotation of the transport roller may be stopped and part of the disk may be sandwiched between the transport roller and the opposing member.

If the disk is inserted into the disk drive from a position deviating from the transport center line in the second direction, the disk can be smoothly loaded into the disk drive without causing a large resistance. This eliminates a mechanism for associating the insertion detection unit with the ejection detection unit. Additionally, the number of components, such as switches, included in the detection units can be minimized.

In the disk drive, the disk at the ejection position may be held by part of the opposing member and the part of the opposing member may be positioned inwardly from the space. This arrangement enables the disk at the ejection position to be firmly sandwiched between the transport roller and the opposing member regardless of the recess.

In the disk drive, the ejection detection unit may be disposed at a position deviating from the transport center line in the second direction.

In the disk drive, the insertion detection unit may include an insertion detection lever that rotates about a support axis orthogonal to a surface of the inserted disk and an insertion switch that is switched by the insertion detection lever pressed and rotated by the disk. The ejection detection unit may include an ejection detection lever that rotates about a support axis orthogonal to the surface of the disk and an ejection switch that is switched by the ejection detection lever pressed and rotated by the disk.

In the disk drive, the insertion detection lever and the ejection detection lever may rotate independently of each other.

In the disk drive, each of the insertion detection unit and the ejection detection unit may include a slider that slides in a direction orthogonal to the loading and unloading directions and a switch that is switched by the slider. Alternatively, each of the insertion detection unit and the ejection detection unit may include an optical detection unit.

DESCRIPTION OF THE PREFERRED EMBODIMENTS

Figure 2:
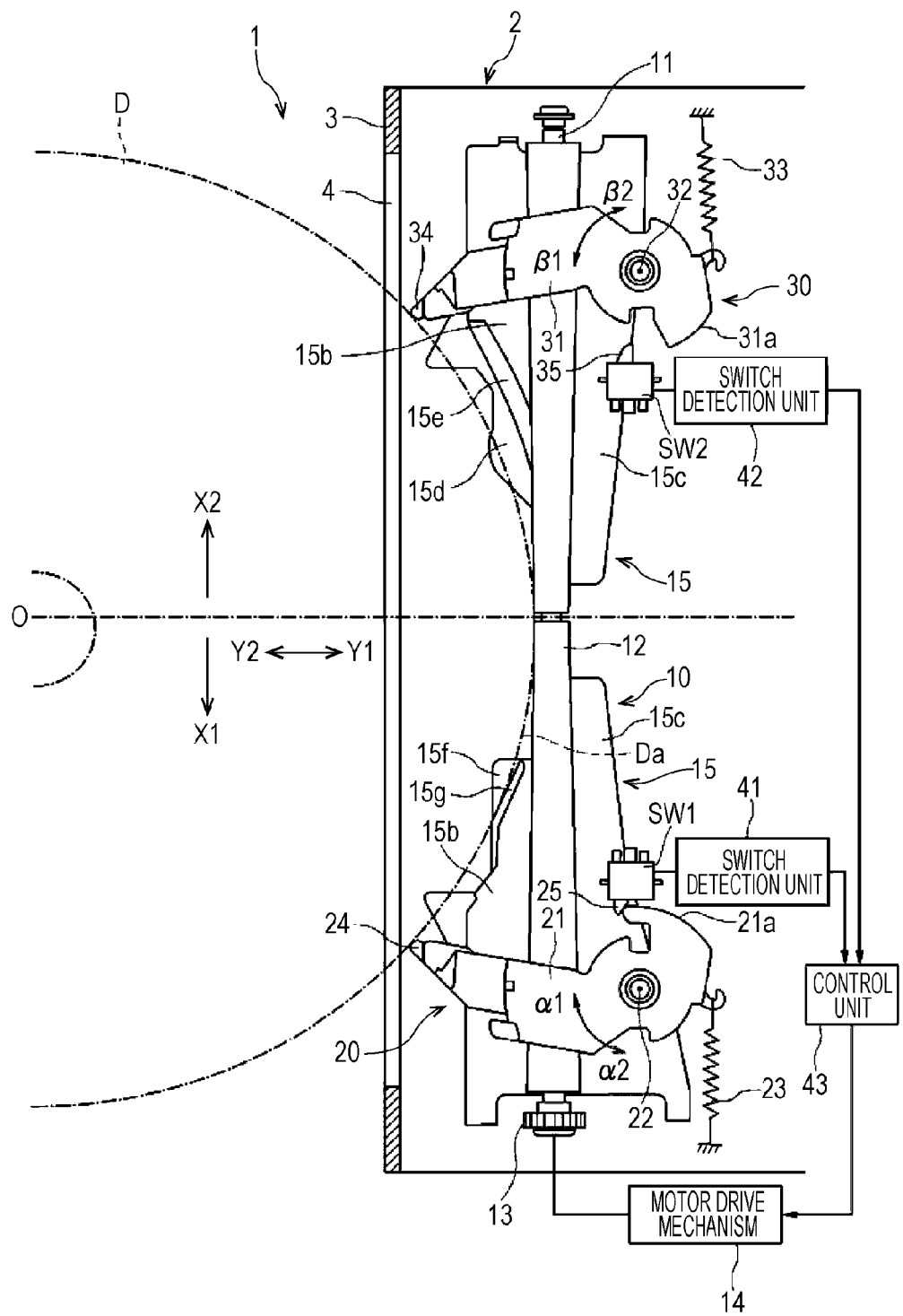
FIG. 2 is a bottom view illustrating essential parts of the disk drive according to the embodiment of the present invention and illustrates a state in which a disk is inserted from a position substantially on a transport center line.

As illustrated in FIG. 2, a disk drive 1 includes a housing 2 and a panel 3 secured to a front portion of the housing 2. The panel 3 has a slit-shaped opening 4. If the disk drive 1 is used in a vehicle, such as an automobile, the housing 2 is embedded in an instrument panel of the automobile and the panel 3 is flush with the instrument panel.

FIGS. 1 to 6 illustrate the disk drive 1 in an inverted orientation or upside down. When actually used, the disk drive 1 is oriented such that a Z1 direction indicates an upward direction and a Z2 direction indicates a downward direction. In FIGS. 1 to 8, a Y1 direction indicates a loading direction in which a disk is transported into the housing 2, and a Y2 direction indicates an unloading direction in which the disk is transported out of the housing 2. A transport center line O is a virtual line that passes through a central part of a transport roller 12 along its axis and a central part of the opening 4 along its width so as to extend in the loading and unloading directions. The transport roller 12 is accommodated in the housing 2. An X1 direction indicates a first direction relative to the transport center line O, and an X2 direction indicates a second direction relative to the transport center line O.

A disk transport mechanism 10 is disposed inside the opening 4 of the panel 3. The disk transport mechanism 10 includes a roller shaft 11. The transport roller 12 composed of synthetic rubber is attached to an outer circumferential surface of the roller shaft 11. The housing 2 accommodates an opposing member 15 facing the transport roller 12. The opposing member 15 is composed of plastic having low frictional resistance. The transport roller 12 is shaped such that the transport roller 12 has a smallest diameter in the vicinity of the transport center line O and the diameter of the transport roller 12 gradually increases in both the first direction X1 and the second direction X2.

The opposing member 15 is fastened to an upper inner surface of the housing 2 located in the Z1 direction. Both ends of the roller shaft 11 are supported by roller brackets (not illustrated). The roller brackets are rotated to shift the roller shaft 11 upward in the Z1 direction or downward in the Z2 direction. To transport a disk D, the roller shaft 11 is shifted in the Z1 direction and is then urged in the Z1 direction by a roller spring.

The roller shaft 11 is fixed at one end to a driven gear 13. To transport the disk D, the roller shaft 11 and the transport roller 12 are rotated in a loading direction φ1 or an unloading direction φ2 by a motor drive mechanism 14 illustrated in FIG. 2.

The opposing member 15 has a shaft receiving recess 15a facing in the Z2 direction. The shaft receiving recess 15a extends parallel to the roller shaft 11 and has a concave surface so as to fit the curved surface of a cylinder, as illustrated in cross-section in FIGS. 7 and 8. The opposing member 15 includes a front holding portion (front holding surface) 15b located in the Y2 direction (unloading direction) relative to the shaft receiving recess 15a and a rear holding portion (rear holding surface) 15c located in the Y1 direction (loading direction) relative to the shaft receiving recess 15a. The front holding portion 15b and the rear holding portion 15c face in the Z2 direction.

Figure 1:
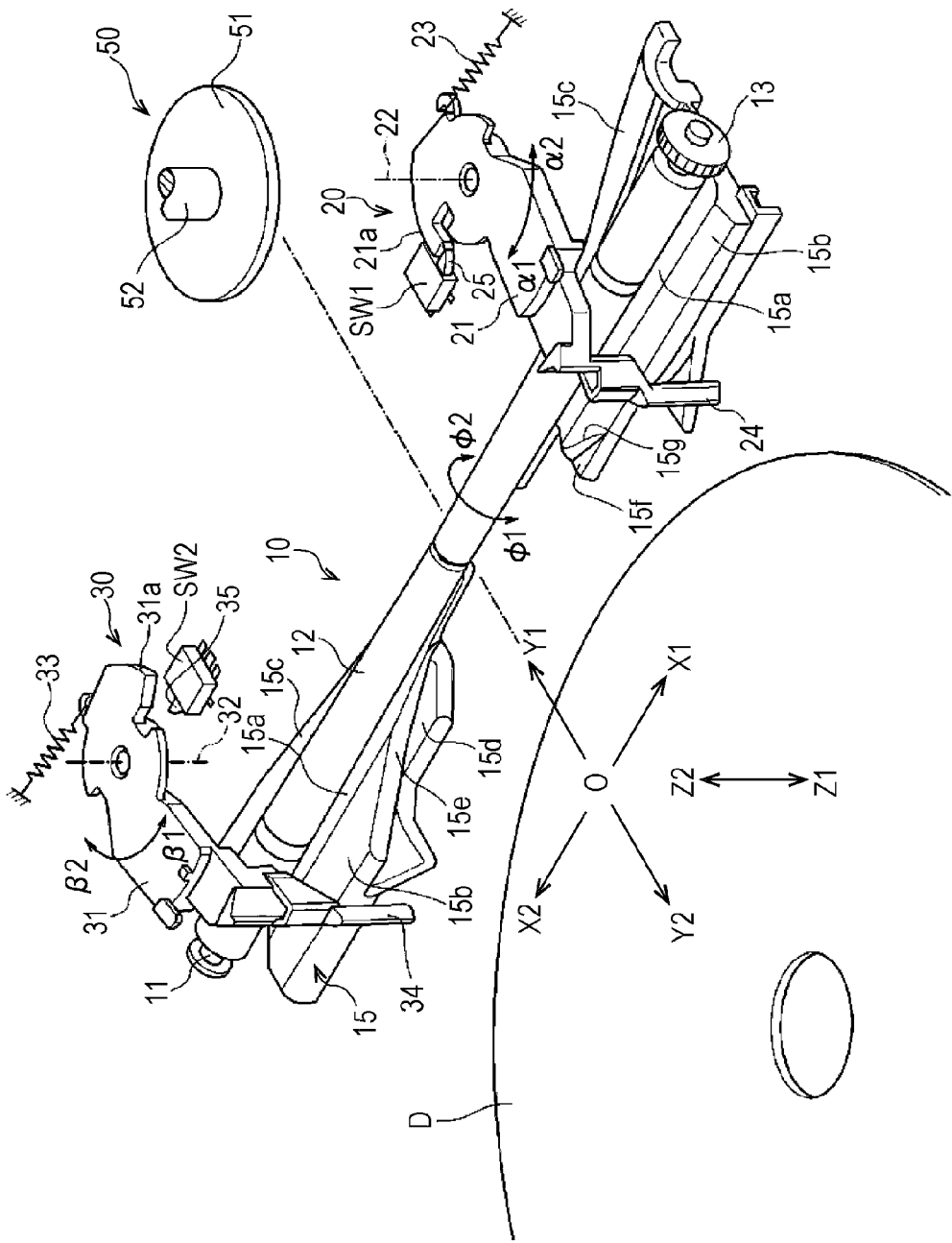
FIG. 1 is a perspective view illustrating essential parts of a disk drive according to an embodiment of the present invention in an inverted orientation.

As illustrated in FIG. 1, the opposing member 15 has a second guiding recess 15d facing in the Z2 direction. The second guiding recess 15d is located in the second direction (X2 direction) relative to the transport center line O. The opposing member 15 further has a beveled surface 15e located between the second guiding recess 15d and the front holding portion 15b. The opposing member 15 further has a first guiding recess 15f located in the first direction (X1 direction) relative to the transport center line O. The opposing member 15 further has another beveled surface 15g located between the first guiding recess 15f and the front holding portion 15b.

Figure 3:
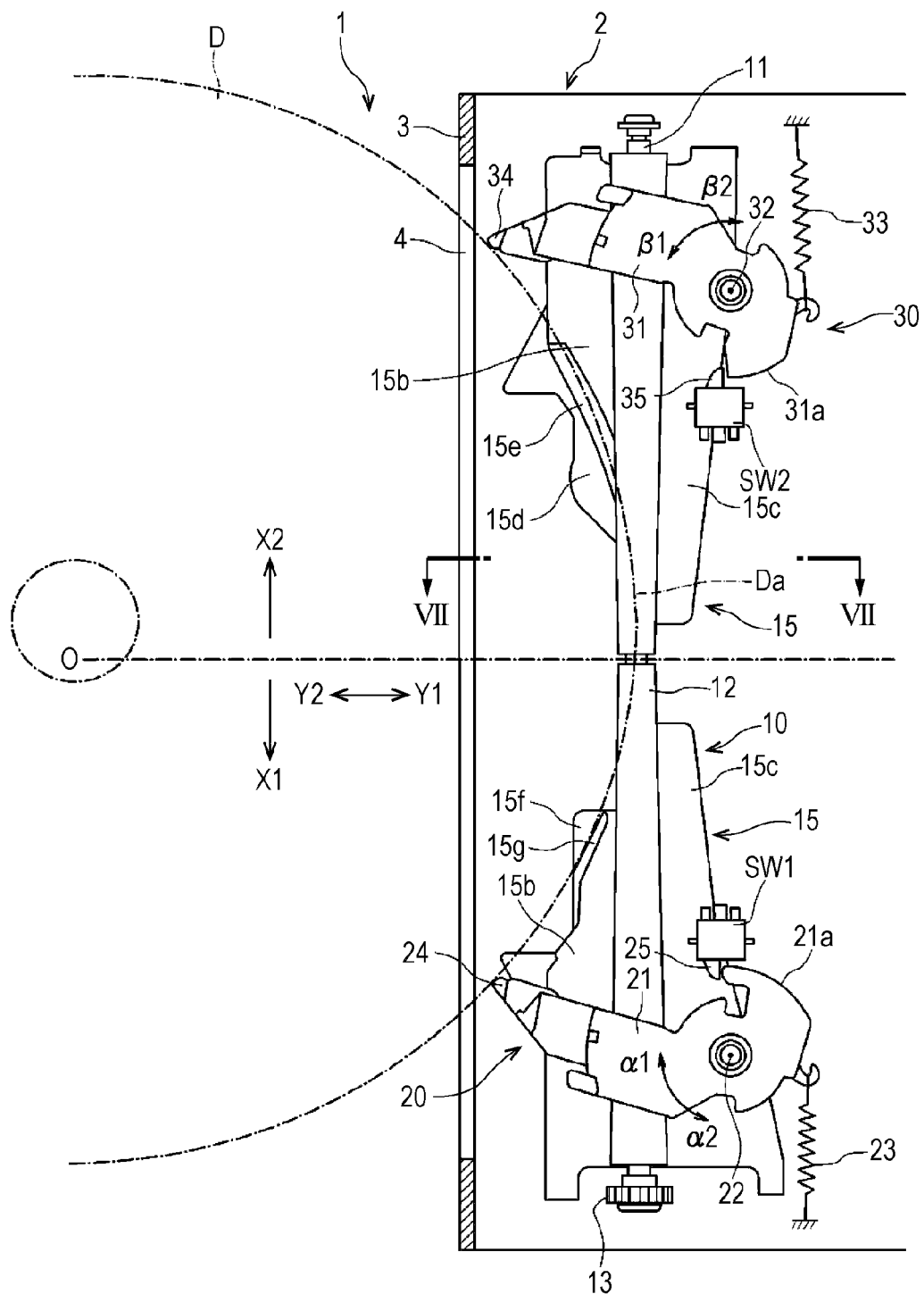
FIG. 3 is a bottom view illustrating essential parts of the disk drive according to the embodiment of the present invention and illustrates a state in which the disk is inserted from a position deviating from the transport center line in a second direction.

FIG. 3 illustrates the disk D having a rim Da partially inserted into the disk drive 1. The rim Da, serving as a leading edge in the loading direction, of the disk D overlaps the transport roller 12. The beveled surface 15e extending from the second guiding recess 15d located in the second direction (X2 direction) relative to the transport center line O is disposed so as to substantially fit the rim Da. The second guiding recess 15d extends to an area that overlaps the axis of the transport roller 12. Consequently, as illustrated in FIGS. 7 and 8, the opposing member 15 and the transport roller 12 define a space S therebetween in an area where the opposing member 15 coincides with the transport roller 12 in the Z1 and Z2 directions.

Figure 7:
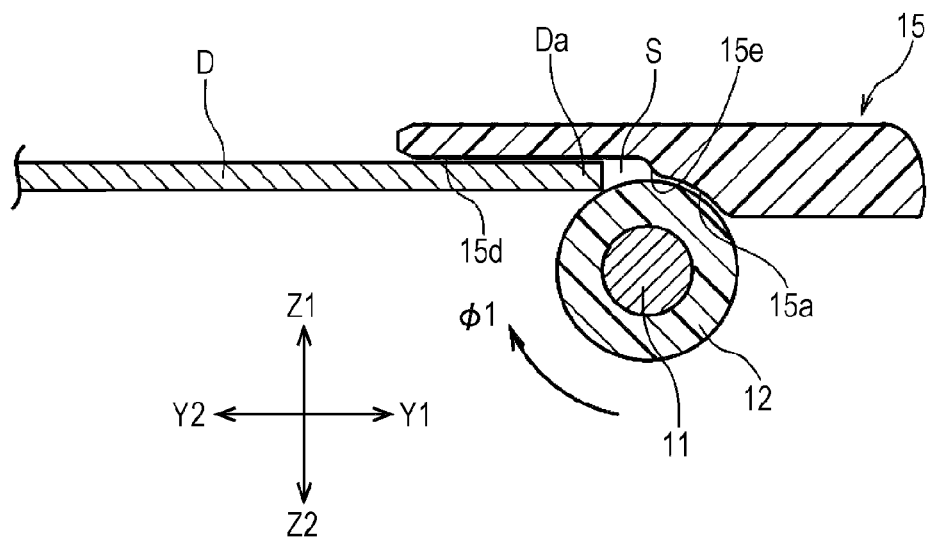
FIG. 7 is a cross-sectional view illustrating the essential parts of the disk drive taken along the line VII-VII in FIG. 3.
Figure 8:
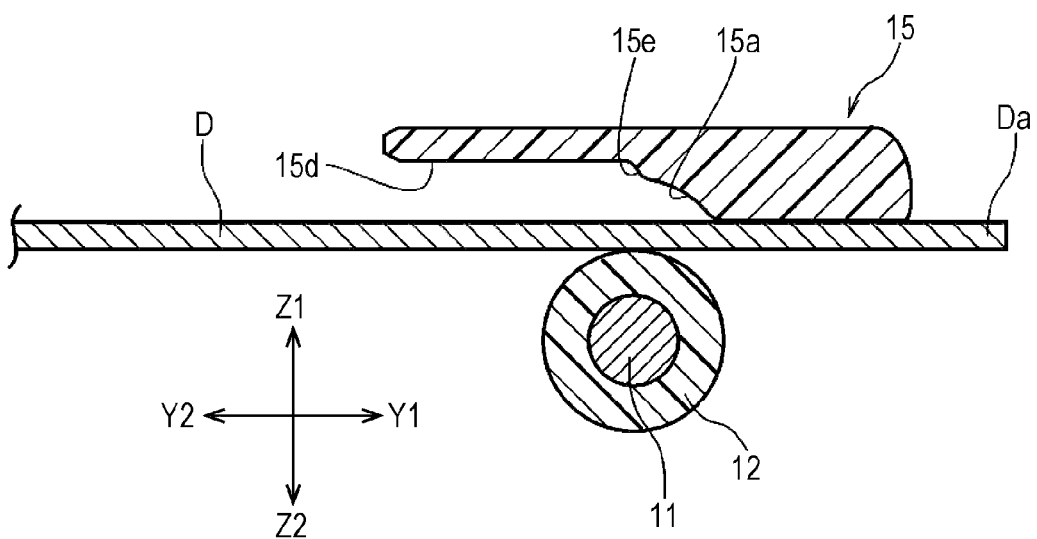
FIG. 8 is a cross-sectional view illustrating the essential parts of the disk drive taken along the line VIII-VIII in FIG. 6.

Referring to FIGS. 7 and 8, the beveled surface 15e extending from the second guiding recess 15d slopes in the Z2 direction so as to approach the transport roller 12 in the loading direction (Y1 direction).

As illustrated in FIGS. 1 and 2, the first guiding recess 15f located in the first direction (X1 direction) relative to the transport center line O is disposed in the unloading direction (Y2 direction) relative to the transport roller 12. The first guiding recess 15f has a smaller area than the second guiding recess 15d. The beveled surface 15g extending from the first guiding recess 15f slopes in the Z2 direction so as to approach the transport roller 12 in the Y1 direction.

As illustrated in FIG. 1, the housing 2 accommodates an insertion detection unit 20 located in the first direction (X1 direction) relative to the transport center line O. The insertion detection unit 20 includes an insertion detection arm 21 composed of plastic. The insertion detection arm 21 has a proximal end located in the Y1 direction relative to the transport roller 12. The insertion detection arm 21 is supported such that the proximal end is rotatable in both an α1 direction and an α2 direction about a support axis 22 extending in the Z1 and Z2 directions.

A detection spring 23 is secured to the proximal end of the insertion detection arm 21. The detection spring 23, which is an extension coil spring, urges the insertion detection arm 21 in the α1 direction. The housing 2 further accommodates a stopper (not illustrated) that restricts rotation of the insertion detection arm 21 in the α1 direction. The insertion detection arm 21 is stable at a position illustrated in FIG. 1 under no external force. The insertion detection arm 21 has a distal end located in the unloading direction (Y2 direction) relative to the transport roller 12. The distal end is integrated with an insertion detection pin 24. The insertion detection pin 24 extends over the transport roller 12 and the opposing member 15 and faces the opening 4 within the housing 2 as illustrated in FIG. 2. The insertion detection unit 20 includes an insertion detection switch SW1. The insertion detection switch SW1 is switched between an ON mode and an OFF mode depending on the angle of rotation of the insertion detection arm 21.

The housing 2 further accommodates an ejection detection unit 30 located in the second direction (X2 direction) relative to the transport center line O. The ejection detection unit 30 includes an ejection detection arm 31 composed of plastic. The ejection detection arm 31 has a proximal end located in the Y1 direction relative to the transport roller 12. The ejection detection arm 31 is supported such that the proximal end is rotatable in both a β1 direction and a β2 direction about a support axis 32 extending in the Z1 and Z2 directions.

A detection spring 33 is secured to the proximal end of the ejection detection arm 31. The detection spring 33, which is an extension coil spring, urges the ejection detection arm 31 in the β1 direction. The housing 2 further accommodates a stopper (not illustrated) that restricts rotation of the ejection detection arm 31 in the β1 direction. The ejection detection arm 31 is stable at a position illustrated in FIG. 1 under no external force. The ejection detection arm 31 has a distal end located in the unloading direction (Y2 direction) relative to the transport roller 12. The distal end is integrated with an ejection detection pin 34. The ejection detection pin 34 extends over the transport roller 12 and the opposing member 15 and faces the opening 4 within the housing 2. The ejection detection unit 30 includes an ejection detection switch SW2. The ejection detection switch SW2 is switched between the ON mode and the OFF mode depending on the angle of rotation of the ejection detection arm 31.

As illustrated in FIG. 2, while no external force is applied to the insertion detection arm 21 and the ejection detection arm 31, the distance in the X1 and X2 directions between the insertion detection pin 24 and the ejection detection pin 34 is less than the diameter of the disk D.

The insertion detection arm 21 and the ejection detection arm 31 rotate independently of each other. The angle of rotation in the α2 direction of the insertion detection arm 21 when the insertion detection switch SW1 is switched differs from the angle of rotation in the β2 direction of the ejection detection arm 31 when the ejection detection switch SW2 is switched.

Figure 4:
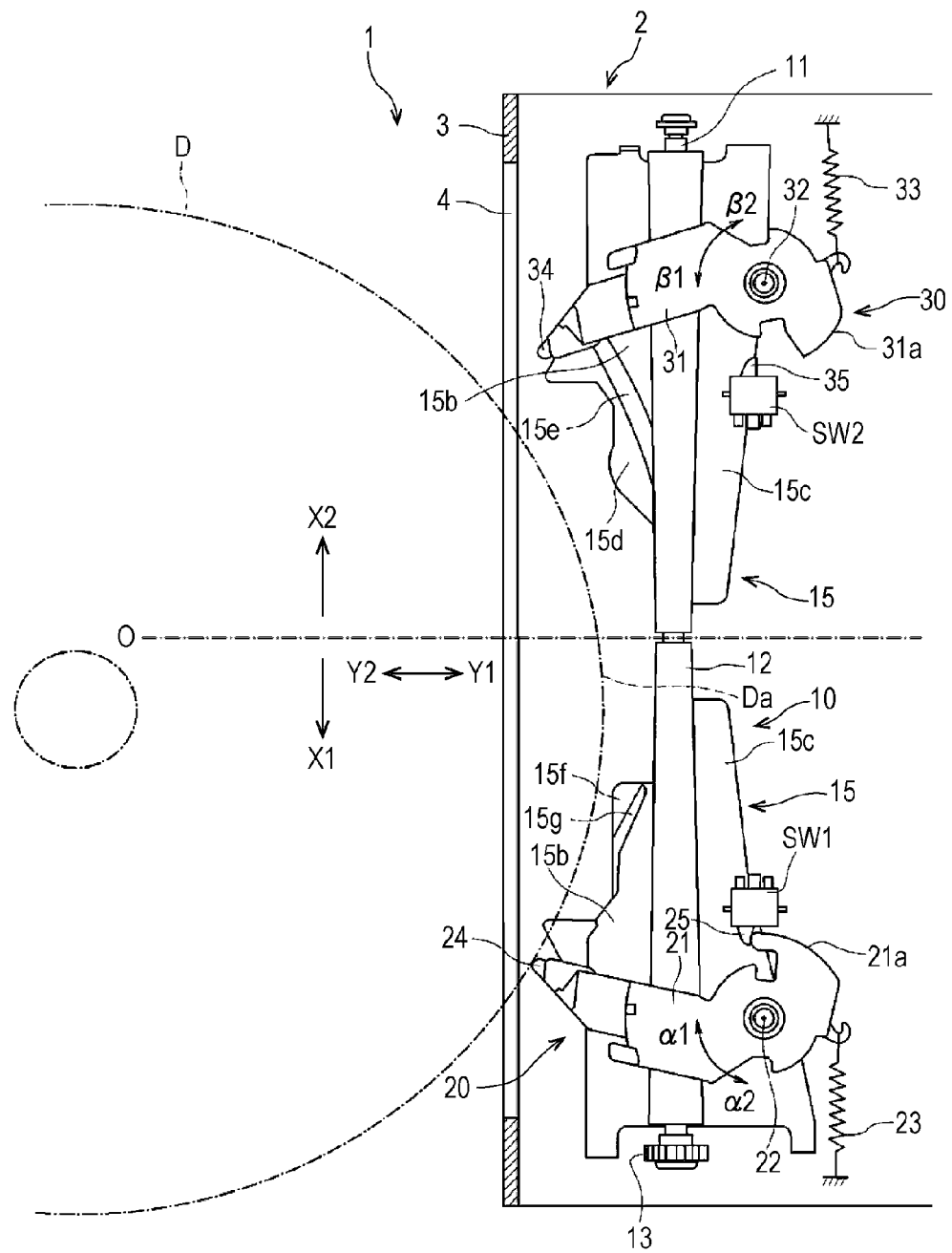
FIG. 4 is a bottom view illustrating the essential parts of the disk drive according to the embodiment of the present invention and illustrates a state in which the disk is inserted from a position deviating from the transport center line in a first direction.
Figure 5:
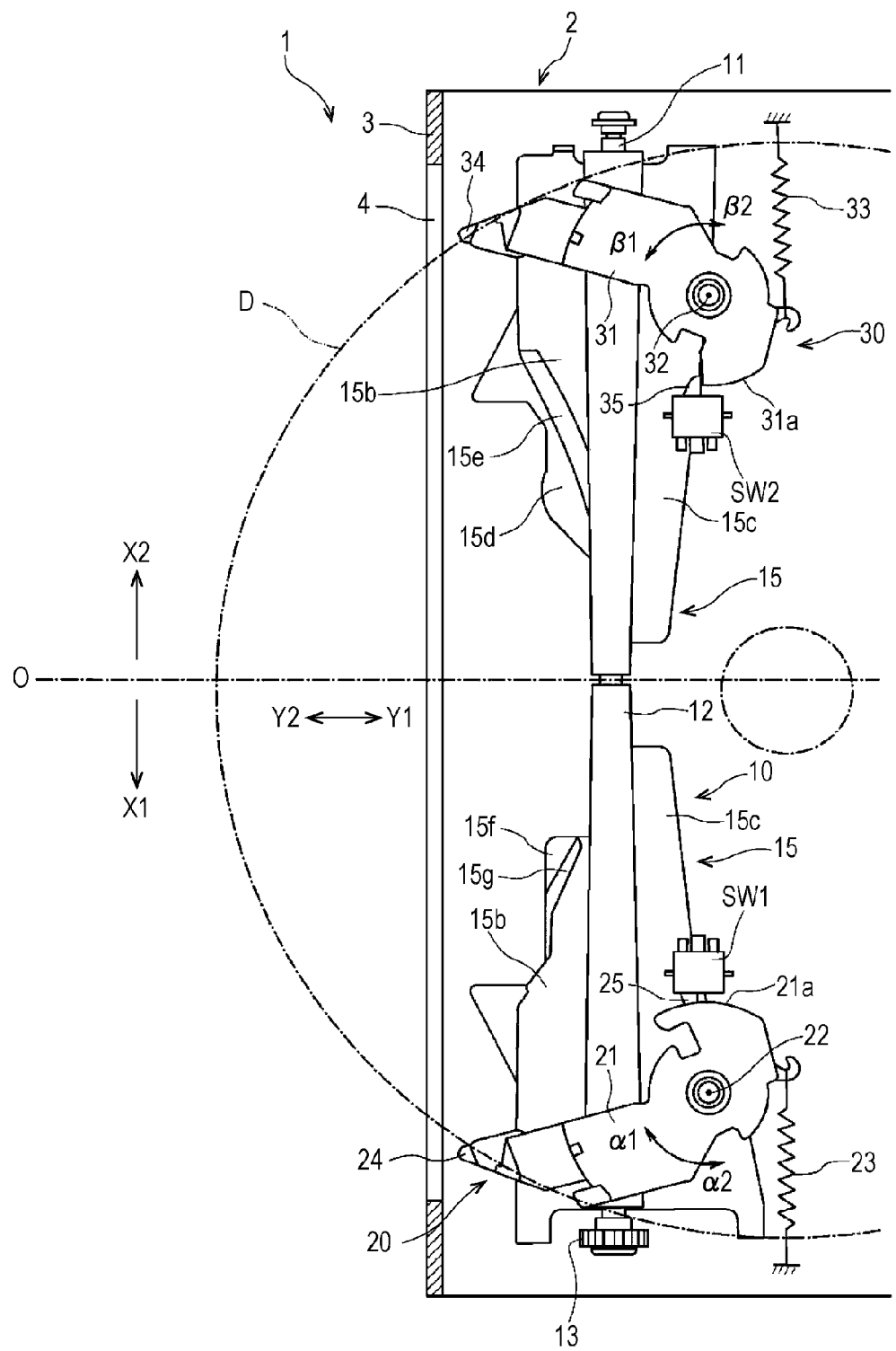
FIG. 5 is a bottom view illustrating the essential parts of the disk drive according to the embodiment of the present invention and illustrates a state in which the disk is transported into a housing.
Figure 6:
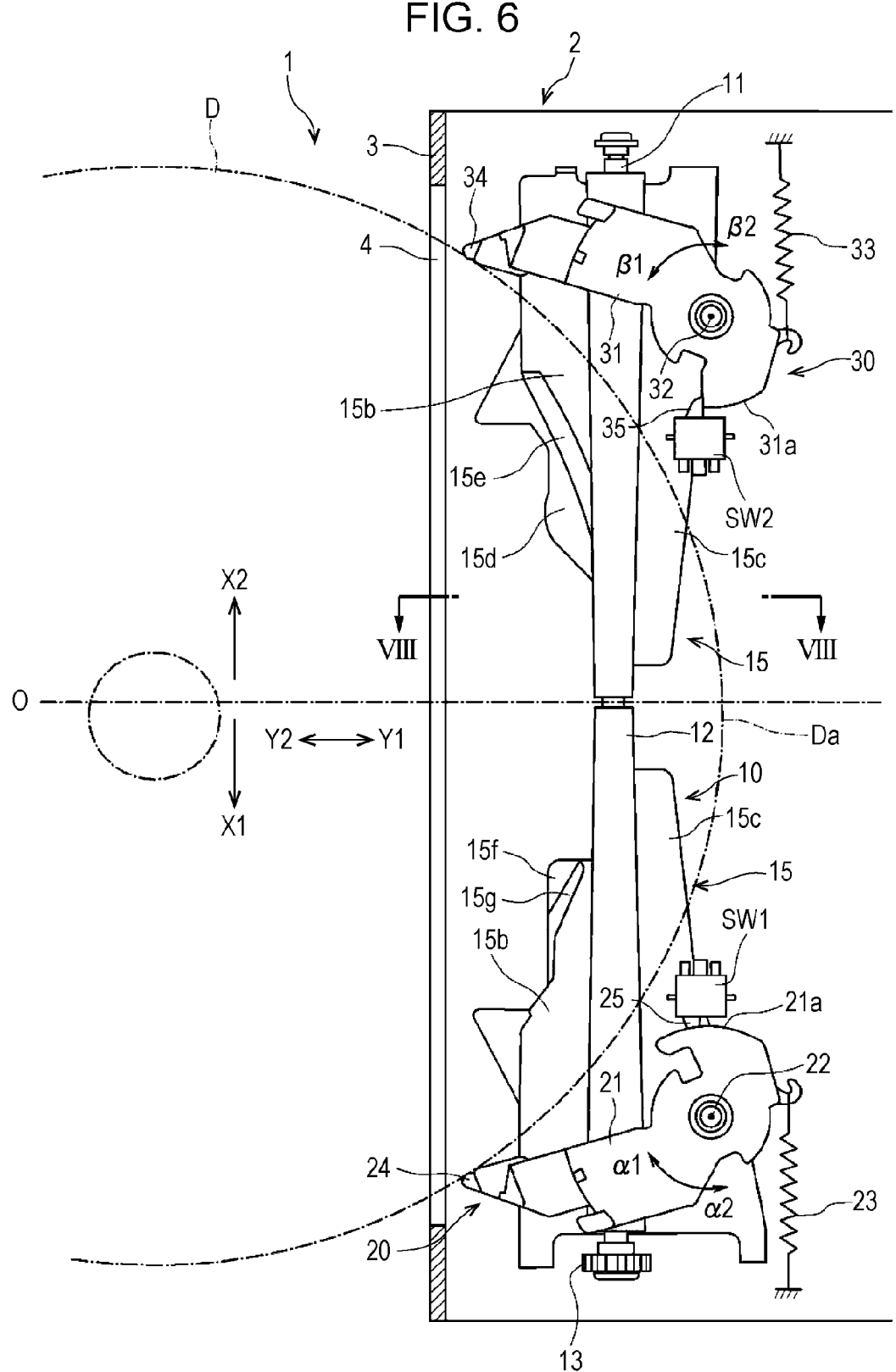
FIG. 6 is a bottom view illustrating the essential parts of the disk drive according to the embodiment of the present invention and illustrates a state in which the disk has reached an ejection position.

As illustrated in FIGS. 2, 3, and 4, when the insertion detection arm 21 of the insertion detection unit 20 is slightly rotated in the α2 direction from the stable position illustrated in FIG. 1, an actuator 25 for the insertion detection switch SW1 moves onto a switching surface 21a of the insertion detection arm 21, so that an output of the insertion detection switch SW1 changes from an OFF level to an ON level. On the other hand, as illustrated in FIGS. 5 and 6, when the ejection detection arm 31 of the ejection detection unit 30 is significantly rotated in the β2 direction from the stable position illustrated in FIG. 1, an actuator 35 for the ejection detection switch SW2 moves onto a switching surface 31a of the ejection detection arm 31.

Referring to FIG. 2, the output of the insertion detection switch SW1 is detected by a switch detection unit 41 and is then supplied to a control unit 43. An output of the ejection detection switch SW2 is detected by a switch detection unit 42 and is then supplied to the control unit 43. The control unit 43 switches an operation of the motor drive mechanism 14 that rotates the roller shaft 11.

As illustrated in FIG. 1, the housing 2 accommodates a rotation drive unit 50. The rotation drive unit 50 includes a turntable 51. The turntable 51 is fastened to a rotation shaft 52 extending in the Z2 direction. The rotation drive unit 50 further includes a spindle motor for driving and rotating the rotation shaft 52. The spindle motor is located in the Z2 direction relative to the turntable 51. The turntable 51 faces a clamper (not illustrated) located in the Z1 direction relative to the turntable 51. The central part surrounding a central hole of the disk D transported in the housing 2 is sandwiched between and held by the turntable 51 and the clamper.

Operations of the disk drive 1 will now be described.
Loading Operation

In a standby state waiting for insertion of the disk D, the roller shaft 11 shifted in the Z1 direction by rotation of the roller brackets is urged in the Z1 direction by the resilience of the roller spring (not illustrated). As illustrated in FIG. 7, the transport roller 12 is accordingly pressed against the surface of the shaft receiving recess 15a of the opposing member 15.

FIG. 2 illustrates a case where the disk D is inserted into the opening 4 such that the center of the disk D substantially coincides with the transport center line O. In this case, when or just before the rim Da, serving as the leading edge in the loading direction, of the disk D reaches the beveled surface 15g extending from the first guiding recess 15f of the opposing member 15, a peripheral portion of the disk D presses the insertion detection pin 24 in the first direction (X1 direction) to rotate the insertion detection arm 21 in the α2 direction, thus switching the insertion detection switch SW1 from the OFF mode to the ON mode.

When the insertion detection switch SW1 is switched from the OFF mode to the ON mode, the switch detection unit 41 transmits an insertion detection signal to the control unit 43. The control unit 43 activates the motor drive mechanism 14 in response to the signal, thus rotating the roller shaft 11 in the loading direction (φ1 direction). In the case of FIG. 2, the roller shaft 11 starts rotating in the loading direction (φ1 direction) just before the rim Da, serving as the leading edge in the loading direction, of the disk D comes into contact with the transport roller 12. Consequently, a leading peripheral portion of the disk D in the loading direction is drawn into the gap between the transport roller 12 and the opposing member 15, so that the disk D is sandwiched between the transport roller 12 and each of the front holding portion 15b and the rear holding portion 15c of the opposing member 15. The disk D is transported into the housing 2 with a force generated by rotation of the transport roller 12.

After the disk D is transported into the housing 2 while the insertion detection switch SW1 is in the ON mode, the peripheral portion of the disk D presses the ejection detection pin 34 in the X2 direction to rotate the ejection detection arm 31 in the β2 direction, thus switching the ejection detection switch SW2 from the OFF mode to the ON mode. Referring to FIG. 5, when the center of the disk D transported into the housing 2 is moved in the Y1 direction beyond a line connecting the insertion detection pin 24 and the ejection detection pin 34, the insertion detection arm 21 is returned in the α1 direction and the ejection detection arm 31 is returned in the β1 direction. Consequently, the ejection detection switch SW2 is switched from the ON mode to the OFF mode and the insertion detection switch SW1 is then switched from the ON mode to the OFF mode.

The disk D is transported to the turntable 51 so as to be located in the Z1 direction relative to the turntable 51. When a loading detection unit (not illustrated) detects alignment of the central hole of the disk D with the turntable 51, the roller brackets are rotated to shift the roller shaft 11 in the Z2 direction, thus releasing the disk D from the transport roller 12 and the opposing member 15. In addition, the clamper is moved so as to press the disk D against the turntable 51, so that the central part of the disk D is sandwiched between the turntable 51 and the clamper. The turntable 51 is rotated together with the disk D by the spindle motor. A head (not illustrated) reads data recorded on the disk D or writes data to the disk D.

FIG. 3 illustrates a case where the disk D is inserted into the opening 4 from a position where the center of the disk D is deviated from the transport center line O in the second direction (X2 direction). In this case, if the disk D is inserted to the same position as that illustrated in FIG. 2, the peripheral portion of the disk D would not press the insertion detection pin 24 in the X1 direction. To switch the insertion detection switch SW1, the disk D would have to be accordingly inserted in the Y1 direction. However, the second guiding recess 15d of the opposing member 15 extends so as to overlap the transport roller 12 in the Z1 and Z2 directions. This allows the rim Da of the disk D to enter the space S between the opposing member 15 and the transport roller 12 in the second direction (X2 direction) as illustrated in FIG. 7. Consequently, the rim Da of the disk D causes the insertion detection arm 21 to rotate in the α2 direction before or substantially at the time when the rim Da comes into contact with the transport roller 12 in a stopped state, thus switching the insertion detection switch SW1 from the OFF mode to the ON mode.

As described above, if the disk D is inserted into the opening 4 from a position deviating from the transport center line O in the second direction (X2 direction), the disk D can be smoothly drawn into the housing 2 without receiving a large insertion reaction force from the transport roller 12 in the stopped state.

FIG. 4 illustrates a case where the disk D is inserted into the opening 4 from a position where the center of the disk D is deviated from the transport center line O in the first direction (X1 direction). In this case, while the disk D is significantly away from the transport roller 12 in the Y2 direction, the disk D presses the insertion detection pin 24 to rotate the insertion detection arm 21 in the α2 direction, thus switching the insertion detection switch SW1 from the OFF mode to the ON mode. The transport roller 12 starts rotating in the loading direction (φ1 direction) while the disk D is away from the transport roller 12 in the Y2 direction, so that the disk D is smoothly drawn into the housing 2 by the rotation of the transport roller 12.

Unloading Operation

When an operation to eject the disk D is selected using, for example, an operation button placed on an operation surface of the panel 3, the roller brackets are rotated under the control of the control unit 43 to shift the roller shaft 11 in the Z1 direction, so that the disk D is sandwiched between the transport roller 12 and the opposing member 15. In the rotation drive unit 50, the clamper is moved away from the turntable 51, thus releasing the disk D from its clamped state where the central part of the disk D is sandwiched between the clamper and the turntable 51.

When the roller shaft 11 is driven in the unloading direction (φ2 direction) by the motor drive mechanism 14, the disk D sandwiched between the transport roller 12 and the opposing member 15 is transported in the unloading direction (Y2 direction).

Referring to FIG. 5, during the unloading of the disk D, a leading peripheral portion of the disk D in the Y2 direction presses the insertion detection pin 24 and the ejection detection pin 34 such that the pins 24 and 34 move away from each other, so that the insertion detection arm 21 is rotated in the α2 direction and the ejection detection arm 31 is rotated in the β2 direction. The rotation of the insertion detection arm 21 in the α2 direction first causes the insertion detection switch SW1 to be switched from the OFF mode to the ON mode and the rotation of the ejection detection arm 31 in the β2 direction then causes the ejection detection switch SW2 to be switched from the OFF mode to the ON mode.

When the disk D is further transported in the Y2 direction to a position illustrated in FIG. 6, the switching surface 31a of the ejection detection arm 31 leaves the actuator 35 for the ejection detection switch SW2, so that the ejection detection switch SW2 is switched from the ON mode to the OFF mode. Upon switching of the ejection detection switch SW2 from the ON mode to the OFF mode, the control unit 43 stops the motor drive mechanism 14. At this time, the insertion detection switch SW1 is still in the ON mode.

When the motor drive mechanism 14 is stopped, the rotation of the roller shaft 11 is stopped. Consequently, the disk D is stopped at an ejection position illustrated in FIG. 6. The transport roller 12 presses part of the disk D located in the Y1 direction relative to the opening 4 against the front holding portion 15b and the rear holding portion 15c of the opposing member 15. The disk D is accordingly held by the opposing member 15 and the transport roller 12. The other part of the disk D stopped at the ejection position projects forward from the opening 4 of the housing 2. Thus, the user can hold and pull the disk D with the user's hand.

The disk drive 1 is configured such that the insertion detection unit 20 and the ejection detection unit 30 operate independently of each other. This enables the time when the insertion detection switch SW1 is actuated by the insertion detection arm 21 to differ from the time when the ejection detection switch SW2 is actuated by the ejection detection arm 31. Specifically, when the disk D is inserted into the opening 4, the insertion detection switch SW1 is switched on earlier than the ejection detection switch SW2 as illustrated in, for example, FIG. 2 so that the transport roller 12 can be caused to start rotating in the loading direction. During the unloading of the disk D, the ejection detection switch SW2 is switched off earlier than the insertion detection switch SW1 so that the disk D can be stopped at the ejection position illustrated in FIG. 6.

If the disk D is inserted from the position deviating from the transport center line O in the second direction (X2 direction) away from the insertion detection unit 20 as illustrated in FIG. 3, the disk D can be guided into the space S illustrated in FIG. 7. Thus, the transport roller 12 can be caused to start rotating in the loading direction before or just after the disk D comes into contact with the transport roller 12 in the stopped state.

Each of the insertion detection unit 20 and the ejection detection unit 30 may include a slider that slides in the X1 and X2 directions orthogonal to the loading and unloading directions of the disk D and a switch that is switched by the slider. Alternatively, each of the insertion detection unit 20 and the ejection detection unit 30 may include an optical detection unit.

The transport roller 12 may be partly reduced in diameter or partly removed in the second direction (X2 direction) to form the space S.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disk drive comprising:
   a transport roller;
   a motor drive mechanism that drives and rotates the transport roller;
   an opposing member facing the transport roller;
   an insertion detection unit disposed at a position deviating from a transport center line in a first direction along an axis of the transport roller, the transport center line passing through a central part of the transport roller along the axis of the transport roller so as to extend in both a loading direction in which a disk sandwiched between the transport roller and the opposing member is transported into the disk drive with a force generated by rotation of the transport roller and an unloading direction in which the disk sandwiched between the transport roller and the opposing member is transported out of the disk drive with a force generated by rotation of the transport roller; and
   a control unit that activates the motor drive mechanism to rotate the transport roller in the loading direction when the insertion detection unit is actuated by the disk,
   wherein the transport roller and the opposing member define a space therebetween to receive the disk inserted from a position deviating from the transport center line in a second direction along the axis of the transport roller.

2. The disk drive according to claim 1, wherein when the space receives the disk inserted from the position deviating from the transport center line in the second direction, the insertion detection unit detects the disk.

3. The disk drive according to claim 1, wherein the opposing member has a recess in at least a portion in the second direction relative to the transport center line and the recess faces the transport roller with the space therebetween.

4. The disk drive according to claim 1, further comprising:
an ejection detection unit that is actuated by the disk when the disk transported out of the disk drive by rotation of the transport roller in the unloading direction reaches a predetermined ejection position,
wherein when the ejection detection unit is actuated, the rotation of the transport roller is stopped and part of the disk is sandwiched between the transport roller and the opposing member.

5. The disk drive according to claim 4, wherein the disk at the predetermined ejection position is held by part of the opposing member and the part of the opposing member is positioned inwardly from the space.

6. The disk drive according to claim 4, wherein the ejection detection unit is disposed at a position deviating from the transport center line in the second direction.

7. The disk drive according to claim 4,
wherein the insertion detection unit includes
an insertion detection lever that rotates about a support axis orthogonal to a surface of the disk inserted, and
an insertion switch that is switched by the insertion detection lever pressed and rotated by the disk, and
wherein the ejection detection unit includes
an ejection detection lever that rotates about a support axis orthogonal to the surface of the disk, and
an ejection switch that is switched by the ejection detection lever pressed and rotated by the disk.

8. The disk drive according to claim 7, wherein the insertion detection lever and the ejection detection lever rotate independently of each other.

9. A disk drive comprising:
a transport roller;
a motor drive mechanism that drives and rotates the transport roller;
an opposing member facing the transport roller;
a single insertion detection unit;
a control unit that activates the motor drive mechanism to rotate the transport roller in a loading direction in which a disk sandwiched between the transport roller and the opposing member is transported into the disk drive with a force generated by rotation of the transport roller when the insertion detection unit is actuated by the disk; and
an ejection detection unit that is actuated by the disk when the disk transported out of the disk drive by rotation of the transport roller in an unloading direction reaches a predetermined ejection position, wherein when the ejection detection unit is actuated, the rotation of the transport roller is stopped while part of the disk is sandwiched between the transport roller and the opposing member.

10. The disk drive according to claim 9, wherein the transport roller and the opposing member define a space therebetween to receive the disk inserted from a position deviating from a transport center line along the axis of the transport roller and when the space receives the disk inserted from the position deviating from the transport center line, the insertion detection unit detects the disk.

11. The disk drive according to claim 10, wherein the opposing member has a recess that faces the transport roller with the space therebetween.

12. The disk drive according to claim 10, wherein the disk at the predetermined ejection position is held by part of the opposing member and the part of the opposing member is positioned inwardly from the space.

13. The disk drive according to claim 10,
wherein the insertion detection unit includes
an insertion detection lever that rotates about a support axis orthogonal to a surface of the disk inserted, and
an insertion switch that is switched by the insertion detection lever pressed and rotated by the disk, and
wherein the ejection detection unit includes
an ejection detection lever that rotates about a support axis orthogonal to the surface of the disk, and
an ejection switch that is switched by the ejection detection lever pressed and rotated by the disk.

14. The disk drive according to claim 13, wherein the insertion detection lever and the ejection detection lever rotate independently of each other.

15. A disk drive comprising:
a transport roller;
a motor drive mechanism that drives and rotates the transport roller;
an opposing member facing the transport roller;
a single insertion detection unit;
a control unit that activates the motor drive mechanism to rotate the transport roller in a loading direction when the insertion detection unit is actuated by the disk; and
an ejection detection unit that is actuated by the disk when the disk transported out of the disk drive by rotation of the transport roller in an unloading direction reaches a predetermined ejection position, wherein when the ejection detection unit is actuated, the rotation of the transport roller is stopped and part of the disk is sandwiched between the transport roller and the opposing member,
and wherein the transport roller and the opposing member define a space therebetween to receive the disk inserted from a position deviating from a transport center line along the axis of the transport roller and when the space receives the disk inserted from the position deviating from the transport center line, the insertion detection unit detects the disk.

16. The disk drive according to claim 15,
wherein the insertion detection unit includes
an insertion detection lever that rotates about a support axis orthogonal to a surface of the disk inserted, and
an insertion switch that is switched by the insertion detection lever pressed and rotated by the disk, and
wherein the ejection detection unit includes
an ejection detection lever that rotates about a support axis orthogonal to the surface of the disk, and
an ejection switch that is switched by the ejection detection lever pressed and rotated by the disk.

17. The disk drive according to claim 16, wherein the insertion detection lever and the ejection detection lever rotate independently of each other.

* * * * *